United States Patent [19]
McLaughlin et al.

[11] Patent Number: 5,637,127
[45] Date of Patent: Jun. 10, 1997

[54] PLASMA VITRIFICATION OF WASTE MATERIALS

[75] Inventors: David F. McLaughlin, Oakmont; Shyam V. Dighe, North Huntingdon; William R. Gass, Plum Boro, all of Pa.

[73] Assignee: Westinghouse Electric Corporation, Pittsburgh, Pa.

[21] Appl. No.: 566,238

[22] Filed: Dec. 1, 1995

[51] Int. Cl.⁶ .................................................. C03B 5/16
[52] U.S. Cl. ........................... 65/134.8; 65/17.4; 65/19; 65/21.3; 65/134.1; 65/134.7; 65/135.9; 65/136.3; 588/2; 588/10; 588/11; 588/12; 588/14; 588/18; 588/19; 588/20; 588/212; 588/252; 588/253; 501/28; 501/155
[58] Field of Search ..................... 65/17.4, 19, 21.3, 65/134.1, 134.7, 134.8, 135.9, 136.3; 588/2, 11, 10, 19, 12, 14, 18, 20, 212, 252, 253; 501/28, 155

[56] References Cited

U.S. PATENT DOCUMENTS

| | | | |
|---|---|---|---|
| 4,376,070 | 3/1983 | Pope et al. | 252/629 |
| 4,528,011 | 7/1985 | Macedo et al. | 65/30.13 |
| 4,761,793 | 8/1988 | Digne et al. | 373/24 |
| 4,980,092 | 12/1990 | Pineau et al. | 252/632 |
| 5,082,603 | 1/1992 | Horie et al. | 252/628 |
| 5,134,946 | 8/1992 | Poovey | 110/346 |
| 5,170,728 | 12/1992 | Tanari | 110/346 |
| 5,188,649 | 2/1993 | Macedo et al. | 65/21.3 |
| 5,273,567 | 12/1993 | Richards | 588/11 |
| 5,281,790 | 1/1994 | Nguyen et al. | 219/121.38 |
| 5,340,372 | 8/1994 | Macedo et al. | 65/21.1 |
| 5,399,833 | 3/1995 | Camacho | 219/121.59 |

Primary Examiner—Donald E. Czaja
Assistant Examiner—Michael Philip Colaianni

[57] ABSTRACT

This invention provides a process wherein hazardous or radioactive wastes in the form of liquids, slurries, or finely divided solids are mixed with finely divided glassformers (silica, alumina, soda, etc.) and injected directly into the plume of a non-transferred arc plasma torch. The extremely high temperatures and heat transfer rates makes it possible to convert the waste-glassformer mixture into a fully vitrified molten glass product in a matter of milliseconds. The molten product may then be collected in a crucible for casting into final wasteform geometry, quenching in water, or further holding time to improve homogeneity and eliminate bubbles.

11 Claims, 3 Drawing Sheets

PLASMA VITRIFICATION OF WASTE MATERIALS

STATEMENT OF GOVERNMENT INTEREST

The United States Government has rights in this invention pursuant to Department of Energy Contract No. DE-AC06-87RL10930.

BACKGROUND OF THE INVENTION

This invention relates to methods for processing waste materials, and in particular, to methods for converting waste materials into a glass.

Large quantities of highly radioactive acid solution have been produced during the processing of radioactive materials. The acid solution was neutralized with sodium hydroxide and stored in tanks for treatment at some later time. Over many years the quantities of such neutralized hazardous waste have grown to very large sizes. The waste itself is highly variable, due to mixing of materials from various processing operations and changes in reprocessing technology over a period of many years.

The waste material includes high-pH sludges and supernatant liquids containing sodium nitrate and hydroxide, formed from neutralization of nitric acid fuel dissolution liquors. Sodium nitrite is also present as a corrosion inhibitor. The sludge layer is viscous and sticky, and contains large quantities of aluminum and iron, along with transuranic species and fission products, with plutonium, technetium, $^{90}Sr$, and $^{137}Cs$ being four species of primary concern. Large quantities of rare earth fluorides or bismuth phosphate may also be found in the sludge layer. The supernatant phase also contains a large variety of other salts, including halides, sulfate, carbonate, phosphate, ferrocyanide, and various organic species.

Vitrification is currently the technology of choice for the disposal of high-level nuclear waste (HLW). Typical vitrification processes such as the use of submerged electrode resistance-heated pot melters, require long residence time to complete the glassforming process. Low-level waste has been converted into concrete-like material known as grout, by the addition of cementaceous material to a low-activity waste solution.

Vitrification would also be appropriate for the disposal of low-level waste (LLW). However, the volume of low-level waste is significantly greater than the volume of HLW. Scaling up such conventional vitrification processes would require very large equipment to process large volumes of waste. It would be desirable to have a waste vitrification process that can process large volumes of radioactive and hazardous waste material.

SUMMARY OF THE INVENTION

This invention provides a process wherein hazardous or radioactive wastes in the form of liquids, slurries, or finely divided solids are mixed with finely divided glassformers (silica, alumina, soda, etc.) and injected directly into the plume of a non-transferred arc plasma torch. The extremely high temperatures and heat transfer rates makes it possible to convert the waste-glassformer mixture into a fully vitrified molten glass product in a matter of milliseconds. The molten product may then be collected in a crucible for casting into final wasteform geometry, quenching in water, or further holding time to improve homogeneity and eliminate bubbles.

This invention has particular applicability to treatment of mixed wastes, where the hazardous component is a toxic organic. At the extremely high temperatures involved, quantitative destruction of organic species will take place. In addition, most hazardous metals will be efficiently encapsulated or dissolved in the final glass matrix. Beyond waste treatment, alternative applications of this process would be the production of glassy chemical feedstocks (such as sodium silicate), and premelting of glassformers in commercial glass making operations (for example fiberglass).

DESCRIPTION OF THE PREFERRED EMBODIMENTS

Figure 1:
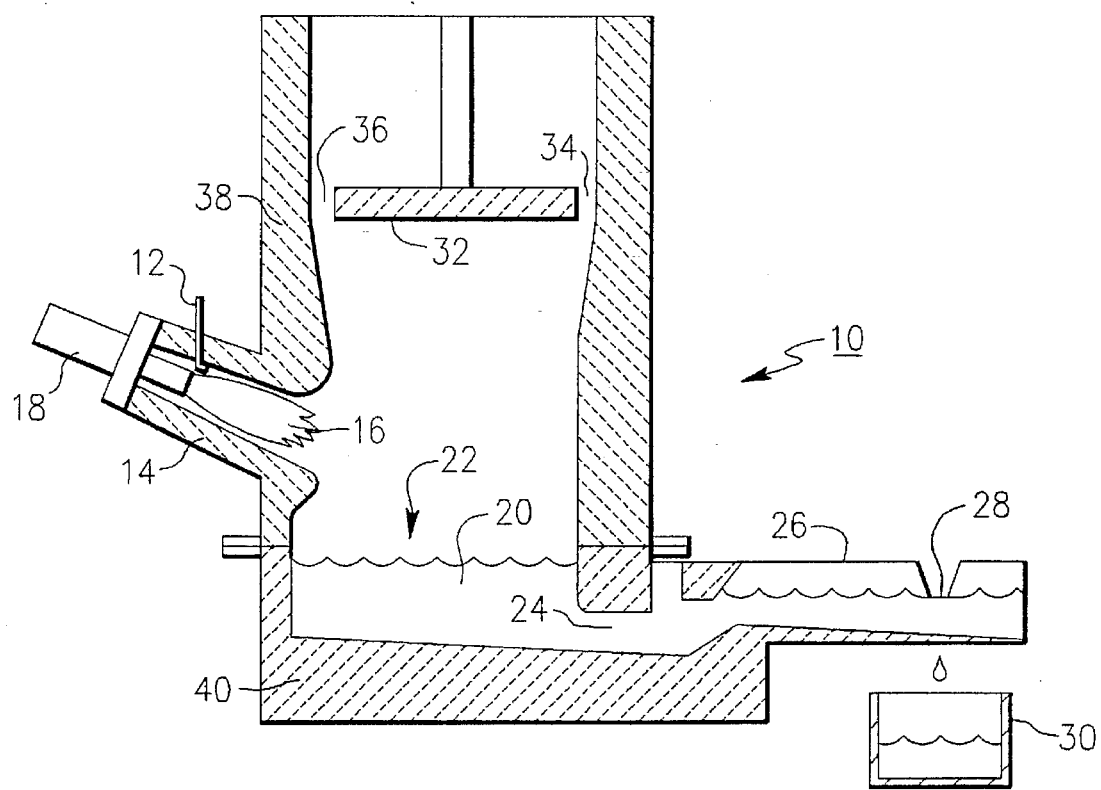
FIG. 1 is a diagram of an apparatus which can be used to carry out the invention.

The method of this invention provides an alternative glass making process, relying on extremely rapid heat transfer between a superheated gas stream, droplets of waste slurry, and particles of glassformer materials. An apparatus 10 which can be used to carry out the invention is shown schematically in FIG. 1. A slurry of waste and glassformers (a mixture of metal oxides such as $SiO_2$, $B_2O_3$, and $CaO$ formulated to produce a final glass composition having the desired viscosity and durability properties) is injected through an injection port 12 into a melting duct 14 (called a tuyere), where it is mixed with a plume 16 of a non-transferred arc plasma torch 18. The tuyere is similar to that shown in U.S. Pat. No. 4,761,793, and is positioned at an angle as illustrated in FIG. 1. The plume is in the form of a high-velocity jet of superheated gas, having temperatures of 5500° C. In typical operation, additional air is mixed with the superheated arc jet to form a plasma having a temperature near 3500° C. In other cases, plasma temperatures can range from 2000° C. to 10,000° C.

The waste-glassformer mixture undergoes a complex series of processes in the tuyere. The water content is first heated to the boiling point and then evaporated. The residual waste salts, now deposited onto particles of glassformer, are further heated until calcination reactions occur, converting hydroxides, nitrates, and nitrites into metal oxides plus $N_2$, $O_2$, and $H_2O$. Further heating raises the oxide-glassformer mixture to the glass melting point, and fuses the mixture. The molten glass 20 then exits the tuyere and is collected in the crucible zone 22, separating from the offgases.

The molten glass can then pass through a tap hole 24 and flow into a holding tank 26. A product spout 28 then permits the glass to flow into a product collector 30 where it solidifies. A radiative baffle plate 32 is provided in the crucible, and offgases resulting from the process can pass through openings 34 and 36 around the baffle plate for further processing. A refractory lining 38 lines the crucible 40.

Although the mixing and heat transfer processes taking place in the tuyere are extremely violent and difficult to simulate, a simplified model was developed in which the glassformer-waste slurry was assumed to be distributed into uniform spherical glassformer particles, each surrounded by a film of waste liquor. Although at the tuyere temperatures radiative heat transfer is very important, it is also extremely difficult to model in the present situation. As a first approximation, therefore, strictly convective heating was modeled from the hot gas (roughly 3500° C. at 1.5 MW torch electrical power and 0.3 std-m³/sec gas flow) to single particles, using the following expression for the heat transfer coefficient between a hot gas and an immersed spherical body:

$$N_{Nu} = 2.0 + 0.6 \, (N_{Re})^{0.5} \, (N_{Pr})^{1/3},$$

where the characteristic length in both the Reynolds and Nusselt numbers is the diameter of the sphere, and the velocity used in the Reynolds number evaluation is the free-steam gas velocity. Gas temperatures and properties were reevaluated after each transfer process, and the heat transfer coefficient recomputed.

Conversion of nuclear waste product storage tank waste to glass is a two step process, in which the steps may be carried out separately or simultaneously. In the first calcination step, the waste nitrate/hydroxide liquid solution or slurry is heated, driving off the free water and waters of hydration. The salt species then decompose upon additional heating (calcination), with nitrate forming either nitrogen and oxygen (the favored high-temperature thermodynamic pathway) or nitrogen oxides (the low-temperature products). If calcination takes place gradually so that denitration occurs after the waste is dry, the resulting product will be $Na_2O$. Rapid thermal denitration in the presence of steam from the waste evaporation yields hydrated sodium oxide (NaOH) as the primary calcination product. The molten calcination products then combine with glassformers to make glass.

Figure 2:
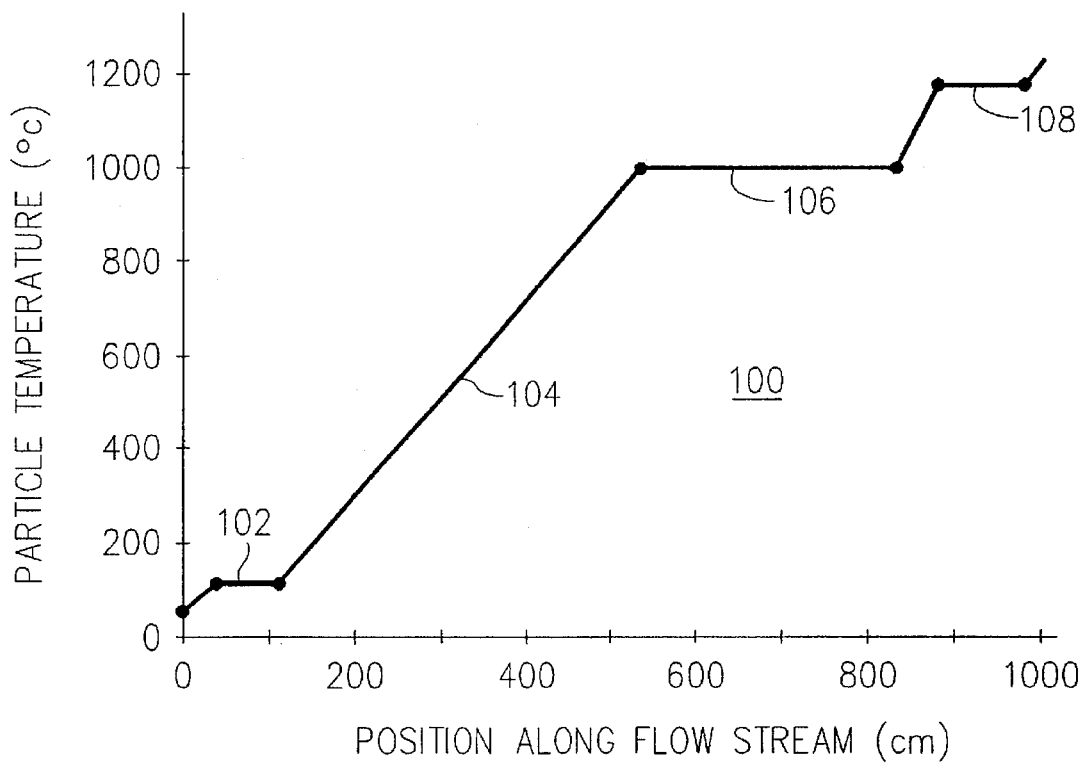
FIG. 2 is a plot of simulated particle temperature versus position in a plasma torch plume.

FIG. 2 presents the results of this simulation (as shown by curve 100), processing 4.3 liters/minute of waste solution (7 molar NaOH, 3M $NaNO_3$, and 2M $NaNO_2$) and 4 kg/minute of glassformer (57 weight percent $SiO_2$, 19% $Al_2O_3$, 13% $B_2O_3$, 6% CaO and 5% other). Portion 102 of curve 100 represents a period during which water in the mixture is boiling. The solids are then heated as shown by curve portion 104. Calcining of salts occurs during portion 106 of the curve. Portion 108 of the curve represents the melting of glass. The model assumes nitrate calcination to occur isothermally at 1000° C. Actual kinetic data for $NaNO_3$ calcination indicate that the process becomes rapid above 1000° C. (complete decomposition in approximately one second), but occurs at significant rates for all temperatures above 700° C. The glass melting temperature of 1150° C. is again an idealization, since glass has no well defined melting point; this value is the temperature at which the formulated composition would exhibit a pour viscosity of 29 Pa.sec.

Using the above model, very large heat transfer coefficients of the order of 1500 J/m²/s/°K are computed, owing to the extreme properties of the hot gas at this temperature and the small size of the particles. It is seen that approximately 12 milliseconds of residence time or 100 cm of travel down the tuyere is predicted to be required to form the glass.

Figure 3:
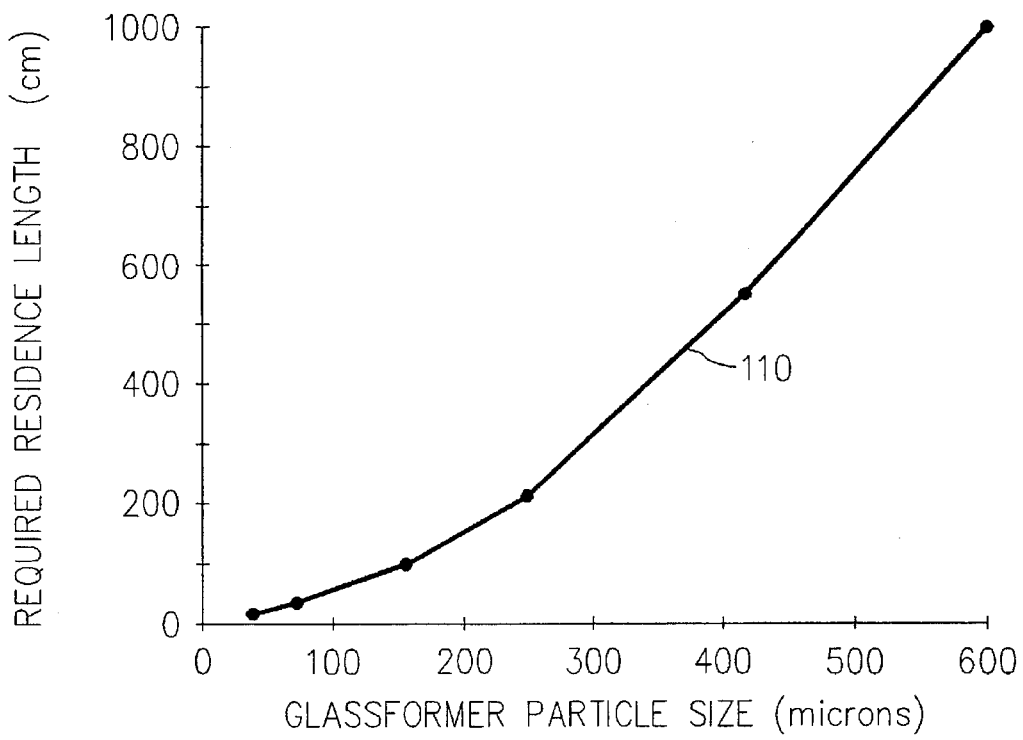
FIG. 3 is a plot of required residence distance versus glassformer particle size.

Curve 110 of FIG. 3 presents a parametric study of the required heat transfer residence time and distance in the tuyere versus the initial particle size of the glassformer. It is seen that although residence times of only a few tens of milliseconds are required due to the extremely rapid heat transfer, complete melting within the tuyere can only be accomplished if the particle size is sufficiently fine. An increase to a 200 μm particle size is predicted to require greater tuyere length than the 114 cm available in the test facility. Although the heat transfer coefficient increases as the particle diameter, D, decreases (by roughly $1/D^{3/2}$), the mass of the particle and therefore the heat required increases as the cube of the diameter. The residence time thus increases as approximately the 3/2 power of the particle size.

Operation of the invention with a 114 cm melting tuyere using simulated nuclear waste and 100 mesh glassformer yielded 14 Mg of a well vitrified product over 59 hours of operation. Sodium from the waste simulant was uniformly incorporated into the silica-boria-calcia-alumina glassformer matrix to form a clear glass product. The glass indicated good durability as measured by a leachability test, and exhibited minimal nonvitreous inclusions with the exception of bubbles and occasional small fragments of $Al_2O_3$ refractory from the tuyere walls. The overall pilot plant energy consumption for production of glass was 15.5 MJ/kg (dry feed basis), which is within a factor of two for large commercial float and container glass manufacture with optimized energy recovery.

Despite the short residence time, 99% destruction of total organic carbon (TOC) was achieved along with at least 93% decomposition of nitrite and 97% destruction of nitrate, based on total $NO_2/NO_3$ recovered in the products including the offgas scrubber. It is worth noting that the high temperature plasma plume nitrate/nitrite decomposition process is predicted from fundamental thermodynamic analysis to yield nitrogen and oxygen gas as the decomposition products, as opposed to the large quantities of nitrogen dioxide typically generated by lower temperature nitrate calcination in joule-heated melters. Analysis of the offgas indicated negligible $NO_x$ produced from waste calcination, although some $NO_x$ was present as a result of oxidation of nitrogen in the plasma arc itself, the result of (optionally) using air as the torch working gas. Some of the observed scrubber nitrate/nitrite is believed to have resulted from absorption of $NO/NO_2$ offgas in the scrubber, so that the above 93 to 97% destruction efficiencies are lower bounds.

Another observation which corroborates the melting mechanism described above is the relatively high efficiency of capture of volatile alkali metals. At melter temperature of 1100° to 1200° C., several sodium and potassium compounds are volatile, including hydroxide, fluoride, and chloride. If the melting process were not rapid and the mixing of molten calcine with glassformer also rapid and efficient, a large fraction of the sodium would be expected to be lost. In fact, 87% of total sodium was recovered in the glass product. While some volatilization took place, most of the sodium was bound in the glass as aluminum and silicon dioxide complexes; the balance was captured in the offgas scrubber.

Figure 4:
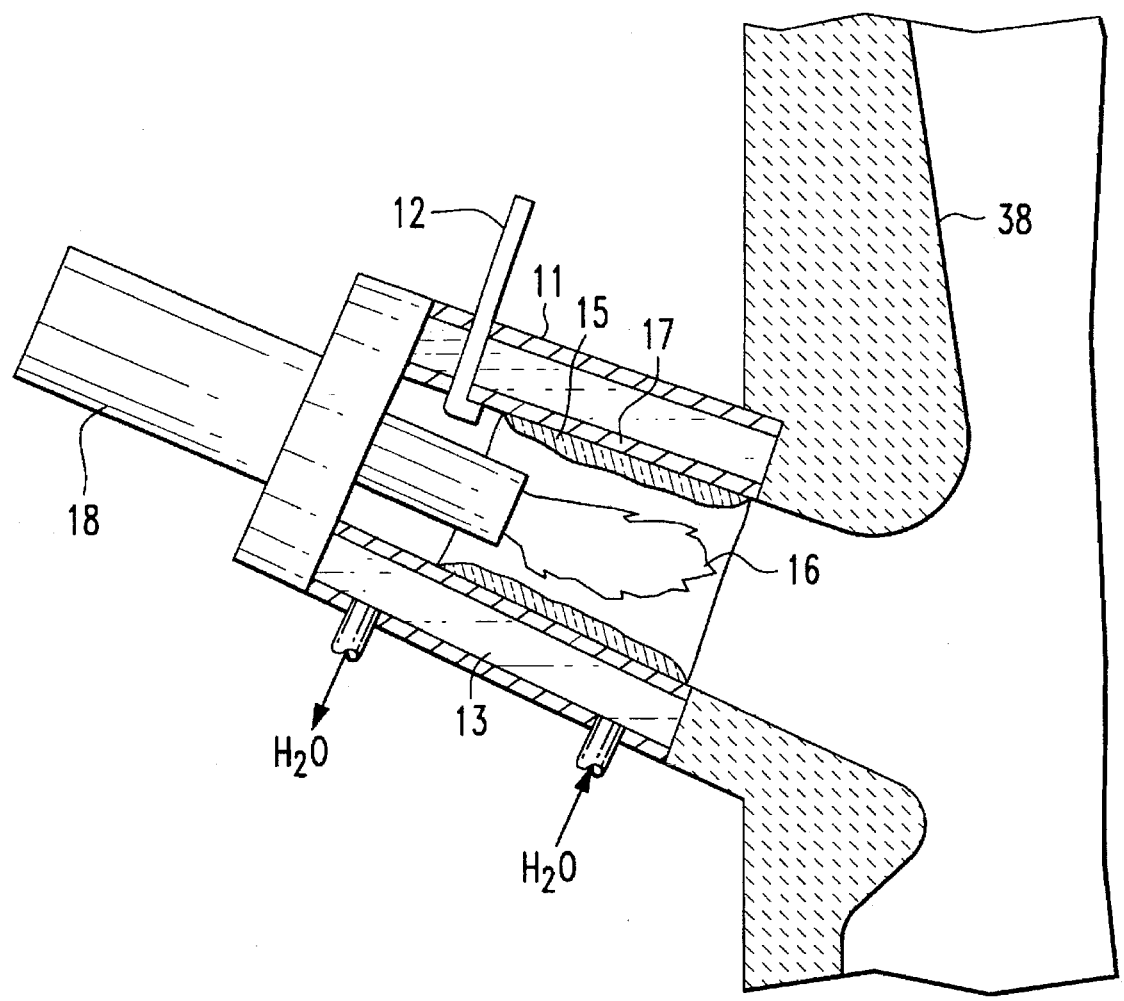
FIG. 4 is a diagram of the water cooled tuyere with the plasma plume and protective skull formation.

A design was formulated, as illustrated in FIG. 4, in which corrosive attack by the molten calcine leaving the plasma plume would be minimized. The process duct 11 would be fabricated of nickel or a high-nickel alloy, with no refractory lining. The walls of the duct would be water cooled 13, allowing a skull coating 15 of frozen salts to accumulate, protecting the metal wall 17. Heat transfer from the hot gas jet would establish the equilibrium skull thickness, minimizing corrosion concerns.

Vitrification takes place extremely rapidly (10 to 100 milliseconds) when the fluid-particle mixture of waste and glassformer is exposed to the high-temperature (3500° C.) plume from the plasma torch, in contrast to commercial glass making processes where many hours are required. Typical residence times for submerged electrode melters is 24 to 48 hours, so that scaling of the throughput for such a joule-heated melter can only be accomplished by increasing the size of the unit. As the diameter grows, so does the inventory of radioactive glass, creating safety concerns if the bottom drain of such a large unit were to fail. Several hundred metric tonnes of inventory are computed to be required for a full-scale 200 Mg/day joule-heated facility, as opposed to only several hundred kilograms for a plasma vitrification system of the same throughput.

A total of 14 metric tonnes of glass product were generated during the testing, with extensive physical and chemical analysis carried out. The waste loading in the final product averaged 26.7%, equivalent to 19.6% $Na_2O$ content in the glass. Despite the very short residence times as compared to traditional glass production systems, the glass product generated by the plasma vitrification system was both homogeneous and of low leachability. Analysis of the inhomogeneities and nonvitreous inclusions ("devitrite") showed most samples to contain <<1% of such material. Observed devitrite was largely due to small granules of aluminum oxide refractory from the tuyere liner which were lost due to corrosive attack by molten glass; again the proposed solution involves a cold skull design, in which water-cooled metal walls in the tuyere are allowed to develop a shell of frozen glass in place of engineered refractory.

Leachability of the final glass product was quantified using a controlled leaching analysis using finely ground material. The glassformer composition was designed to yield a borosilicate glass having low leachability up to 20% $Na_2O$ content. Leach testing for Na, K, B, and Si revealed that the final product exhibited normalized leach ratios of less than 0.05 $gm/m^2/day$ for all species analyzed.

The method of this invention is readily scalable to full production requirements. At 3.8 liters/minute waste simulant throughput, the glass production rate in the pilot plant melter was 6.9 metric tonnes/day, 3.5% of a full-scale 200 Mg/day production throughput. In large plant designs, multiple torches can be used to feed into a single central crucible collection system which feed multiple pour spouts.

This invention has been demonstrated for the treatment of radioactive waste containing high sodium content, nitrates, hazardous organics and a wide range of radioactive species. One-step vitrification of tank waste liquid has been demonstrated at the pilot scale, in which 7 metric tonnes per day of good quality waste glass were produced by plasma vitrification of tank waste simulant with glassformer frit additive. This invention provides an alternative technology for production of glass from finely divided solid or liquid feedstocks. The extremely rapid heat transfer rates possible when mixing particulate or droplet feed materials with the plume of a plasma torch makes possible production of fully melted and homogeneous glass droplets in an extremely short period of time compared to most glassmaking processes. While longer residence times would be required for fining of the glass to completely eliminate bubbles and other inclusions in the production of commercial glass, the plasma process offers significant advantages in residence time, throughput, and equipment size as compared to conventional glassmaking processes in the vitrification of waste materials or the production of oxide feedstock materials such as sodium silicate. The high energy density of the plasma arc heater provides a great deal of flexibility in the type of waste which can be processed, incorporating simultaneous melting and vitrification with calcination of non-oxide feeds and destruction of organic species.

While specific embodiments of the invention have been described in detail, it will be appreciated by those skilled in the art that various modifications and alternatives to those details could be developed in light of the overall teachings of the invention. Accordingly, the particular arrangements disclosed are meant to be illustrative only and not limiting as to the scope of the invention which is to be given the full breadth of the appended claims and any and all equivalents thereof.

What is claimed:

1. A method of processing waste materials to form molten glass comprising the steps of:

providing a waste material-glassformer mixture of waste material and glass forming material;

injecting said mixture into a tuyere;

providing a plasma torch capable of producing a plasma plume within the tuyere to produce melting and oxidation of the mixture resulting in vitrification of the mixture while the mixture is flowing within the tuyere and molten glass exiting the tuyere; and solidifying the vitrified mixture.

2. The method of claim 1, wherein the glass forming material comprises at least one of $SiO_2$, $B_2O_3$, $Al_2O_3$ and CaO.

3. The method of claim 2, wherein the glass forming material is nominally 100 mesh in size.

4. The method of claim 1, wherein the waste material is a liquid and the glass forming material is a solid such that the mixture is a slurry.

5. The method of claim 1, wherein the waste material is a solid and the glass forming material is a solid.

6. The method of claim 1, wherein the plasma plume has a temperature in the range of 2000° C. to 10,000° C.

7. The method of claim 1, wherein the mixture is in the plume for less than 200 milliseconds.

8. The method of claim 1 wherein the tuyere has metal, water-cooled walls.

9. The method of claim 8, wherein portions of the vitrified mixture form a protective skull on the walls of the tuyere.

10. The method of claim 1, wherein the plume is formed within a tuyere, said tuyere opening into a crucible, and being positioned such that the vitrified mixture pours into the crucible.

11. The method of claim 1, wherein the torch is a non-transferred arc torch.

* * * * *